United States Patent

Eger et al.

[11] Patent Number: 6,117,476
[45] Date of Patent: Sep. 12, 2000

[54] HEALTHY FOOD SPREADS

[75] Inventors: Shaul Eger, Yokneam Moshava 20600; Isaac Neeman, Haifa, both of Israel

[73] Assignees: Shaul Eger, Yokneam; Menachem Ehrich, Rehovot, both of Israel

[21] Appl. No.: 09/225,231

[22] Filed: Jan. 4, 1999

[51] Int. Cl.$^7$ ..................................................... A23D 9/007
[52] U.S. Cl. .......................................... 426/601; 426/607
[58] Field of Search ..................................... 426/601, 607

[56] References Cited

U.S. PATENT DOCUMENTS

| | | | |
|---|---|---|---|
| 3,889,011 | 6/1975 | Read | 426/604 |
| 4,229,488 | 10/1980 | Suggs | 426/557 |
| 4,764,392 | 8/1988 | Yasufuku | 426/603 |
| 5,352,475 | 10/1994 | Tholl | 426/603 |
| 5,409,727 | 4/1995 | Tholl | 426/601 |
| 5,470,598 | 11/1995 | Scavone | 426/601 |

FOREIGN PATENT DOCUMENTS

| | | |
|---|---|---|
| 0 171 112 | 7/1985 | European Pat. Off. . |
| 0421504 | 6/1990 | European Pat. Off. . |
| 500152 | 1/1992 | European Pat. Off. . |
| 2244717 | 11/1991 | Guadeloupe . |
| 56-63633 | 4/1981 | Japan . |
| 60-034129 | 2/1985 | Japan . |
| 2239256 | 6/1991 | United Kingdom . |
| 2292949 | 8/1995 | United Kingdom . |
| 2293828 | 4/1996 | United Kingdom . |

OTHER PUBLICATIONS

Hui 1996 Baileys Industrial Oil & Fat Products 5$^{th}$ ed. vol. 4 John Wiley & Sons Inc New York p 547–551.

*Primary Examiner*—Carolyn Paden
*Attorney, Agent, or Firm*—Mark M. Friedman

[57] ABSTRACT

The present invention is of a food spread containing a mixture of an edible oil of natural origin and a monoglyceride. The oil is preferably one or more of the oils from the group of olive oil, avocado oil, canola oil, soybean oil, sunflower oil, peanut oil, safflower oil, cottonseed oil, coconut oil, rice bran oil, mustardseed oil, camelina oil, chia oil, flaxseed oil, perilla oil, fish oil or corn oil. More preferably an oil such as avocado oil or olive oil is used and most preferably the oil is olive oil. The monoglycerides used are preferably derivatives of oleic, or palmitic acid. The ratio of oil to monoglyceride is preferably from about 9 to about 1 to from about 49 to about 1 and most preferably from about 15 to about 1 to from about 24 to about 1. The more monoglyceride used, the greater the degree of solidity of the food spread at room temperature. It is therefore possible to produce a desired degree of solidity, by changing the proportion of monoglyceride.

24 Claims, No Drawings

HEALTHY FOOD SPREADS

FIELD AND BACKGROUND OF THE INVENTION

The present invention relates to a novel food spread and its production. In particular, it concerns a food spread containing a mixture of an edible oil from a natural origin and a monoglyceride.

Food spreads such as margarine and butter are commonplace in the kitchen. They are used in the home and industry for cooking, baking, sandwiches and numerous food products. In recent years, attention has been directed to producing healthier food spreads, in the form of reduced fat alternatives to the existing products.

Margarines contain a water phase and an oil phase, which are emulsified. They are generally in the form of a water-in-oil emulsion. The taste of margarines and food spreads is due mostly to water soluble flavors, oil soluble flavors and salt included in the water phase. Margarine type compounds contain at least 80% of fat by weight. The fat content is made up mainly of polysaturated fats. In the production of margarine the polysaturated fats are hydrogenated, however the hydrogenated products are very readily acidified to produce free radical carcinogenic compounds.

Butter, margarine and food spreads contain preservatives and need to be refrigerated. They have no known positive health value and their use is therefore generally based on their taste and cooking properties.

The therapeutic properties of oils from natural origins, such as olive oil and avocado oil have been widely documented. Olive oil has been indicated as having a therapeutic effect in stomach ailments (1, 1a), increasing memory (2), decreasing mortality from heart disease due to increasing blood flow (3) and softening skin (4). Additionally, olive oil is used in relieving ear infection, may reduce the risk of certain cancers (5, 6), decreases calcium loss from bones and increases mineral absorption (7). In children, olive oil has been linked to stimulating growth and development (8).

The properties of olive oil result from its chemical structure. Olive oil is made up of 75% oleic acid, monounsaturated fatty acid, approximately 14% polyunsaturated fatty acids, mainly linoleic acid and about 11% saturated fatty acids. Oleic acid, the main constituent of olive oil is very stable and is therefore less readily acidified to produce carcinogenic free radicals. In contrast, margarine consists of mainly (64%) polysaturated fatty acids and only 30% monounsaturated fatty acids.

Likewise, the properties of avocado oil are a result of its structure. It is made up of 10% 18:2 ω-6 fatty acid, 70% 18:1 ω-9 fatty acid and 20% 18:0 ω-6 fatty acid. As is the case in olive oil, a major component of avocado oil is monounsaturated fatty acid. Avocado oil has an characteristically bitter taste. On distillation of the oil, the taste improves, but the nutrition value decreases.

U.S. Pat. Nos. 4,226,895, 4,284,655 and 4,509,727 disclose food spreads containing an oil in water emulsion. However, in the present invention, water, is not used.

U.S. Pat. No. 5,360,626 discloses an edible food product containing an oil phase thickened with a texturizing agent comprising an alkyl-substituted, non-nitrogen containing oil-soluble polymer having a molecular weight of at least 2000 daltons. The monoglyceride of the present invention is less than 2000 daltons. In addition, a food spread is disclosed containing an aqueous phase and an oil phase. The present invention does not contain an aqueous phase.

U.S. Pat. No. 5,376,398 discloses a fat component useful for preparing a reduced calorie food product, the fat component comprising an edible triglyceride and a polytetramethylene ether glycol esterified with a fatty acid entity. In contrast, the present invention does not contain a polytetramethylene ether glycol.

The background art discloses reduced fat alternatives to margarines and existing food spreads, however, non of these prior art references suggests the production of a food spread containing a mixture of only an oil of natural origin with therapeutic properties and a monoglyceride.

There is thus a widely recognized need for, and it would be highly advantageous to have, a healthy food spread as is described in the present invention.

SUMMARY OF THE INVENTION

The present invention provide a healthy food spread containing a mixture of edible oil of natural origin and a monoglyceride.

According to the teaching of the present invention there is provided in a first embodiment a food spread comprising a mixture of an edible oil and a monoglyceride.

In a preferred embodiment the food spread further comprises a fat soluble flavor.

In a preferred embodiment the oil is selected from one or more of the oils from the group consisting of olive oil, avocado oil, canola oil, soybean oil, sunflower oil, peanut oil, safflower oil, cottonseed oil, coconut oil, rice bran oil, mustardseed oil camelina oil, chia oil, flaxseed oil, perilla oil and corn oil.

In a preferred embodiment the oil is olive oil.

In a preferred embodiment the oil is fish oil.

In a preferred embodiment the oil is avocado oil.

In a preferred embodiment the monoglyceride is a derivative of oleic acid.

In a preferred embodiment the monoglyceride is a derivative of palmitic acid.

In a preferred embodiment the oil is present in an amount of from about 90 to about 98 percent.

In a preferred embodiment the oil is preferably present in an amount of from about 94 to about 96 percent.

In a second embodiment the present invention provides a method of producing a food spread comprising the steps of mixing at least one edible oil and at least one monoglyceride to produce a dissolved mixture, heating the dissolved mixture and cooling the dissolved mixture.

In a preferred embodiment the step of heating is performed at a temperature in a range of from about 45 to about 75° C.

In a preferred embodiment the step of heating is performed at a temperature in a range of from about 60 to about 75° C.

In a preferred embodiment the step of heating is performed at a temperature in a range of from about 68 to about 70° C.

In a preferred embodiment the method of producing a food spread further comprises the step of adding a fat soluble flavor.

In a third embodiment the present invention provides a food spread consisting essentially of an edible vegetable oil and a monoglyceride.

The term 'natural origin' as used herein refers to all edible vegetable oils with the exception of synthetic oils.

The term 'edible oil' refers to all oils of plant origin and fish oils.

The term 'olive oil' refers to all types of purity of olive oil known to one skilled in the art.

DESCRIPTION OF THE PREFERRED EMBODIMENTS

The present invention is of a food spread containing a mixture of an edible oil of natural origin and a monoglyceride. The oil is preferably one or more of the oils from the group of olive oil, avocado oil, canola oil, soybean oil, sunflower oil, peanut oil, safflower oil, cottonseed oil, coconut oil, rice bran oil, mustardseed oil, camelina oil, chia oil, flaxseed oil, perilla oil or corn oil. More preferably an oil such as avocado oil or olive oil is used and most preferably the oil is olive oil. The monoglycerides used are preferably derivatives of oleic, or palmitic acid. The oil is present preferably in an amount of from about 90 to about 98 percent and most preferably of from about 94 to about 96 percent. The more monoglyceride used, the greater the degree of solidity of the food spread at room temperature. It is therefore possible to produce a desired degree of solidity, by changing the proportion of monoglyceride. The ratio of oil to monoglyceride is preferably from about 9 to about 1 to from about 49 to about 1 and most preferably from about 15 to about 1 to from about 24 to about 1.

At room temperatures monoglycerides are not soluble in olive oil. The monoglycerides are dissolved in the oil at temperatures of from about 45° C. to about 75° C. and preferably from about 60° C. to about 75° C. and more preferably from about 68° C. to about 70° C. At these temperatures, the monoglycerides dissolve and the olive oil mixture become a transparent solution. On cooling to room temperature, the solution is transformed to a food spread.

In the case of oils such as avocado oil where the taste is less distinctive or less appealing, natural fat soluble flavoring can be added.

The commercially available food spreads are mostly manufactured for their taste, rather than for any health benefit. Margarine food spreads are made by hydrogenation of polysaturated acids, which produce compounds that are easily acidified to free radicals resulting in carcinogenic products. Consequently, there is a tremendous need for a healthy food spread alternative, such as is provided in the present invention. The food spread of the present invention is made without hydrogenation of the oil and uses oils that have potential therapeutic properties.

The spread of the present invention is particularly advantageous, due to the simplicity of the process of manufacture. Only 3 simple steps are involved, mixing, heating and cooling. The process does not involve the more expensive procedures of hydrogenation or high pressure. The effective temperature range of from about 45° C. to about 75° C., preferably from about 60° C. to about 75° C. and more preferably from about 68° C. to about 70° C. is easily achieved. This temperature range is important as at temperatures below, the spread is not produced. It is unexpected that an oil, such as olive oil, which is liquid at room temperature, should become a solid spread with the addition of only a monoglyceride. Due to the simplicity of manufacture and few ingredients of the spread, this process is very economical. The resulting food spread has an unlimited shelf life.

In addition, the product of the invention not only has a nutritional basis, but also has potential positive therapeutic properties depending on the oil ingredient.

It is to be understood that the invention is not limited in its application to the details of construction and the arrangement of the components set forth in the following description. The invention includes other embodiments and can be practiced or implemented in various ways. Also it is to be understood that the phraseology and terminology employed herein is for the purpose of description only and should not be regarded as limiting.

The present invention may be better understood with reference to the examples and the accompanying description.

EXAMPLE 1

General Method of Food Spread Production

The food spread of the present invention contains a mixture of an edible oil of natural origin and a monoglyceride. The oil is preferably one or more of the oils from the group of olive oil, avocado oil, canola oil, soybean oil, sunflower oil, peanut oil, safflower oil, cottonseed oil, coconut oil, rice bran oil, mustardseed oil, camelina oil, chia oil, flaxseed oil, perilla oil, fish oil or corn oil. More preferably an oil such as avocado oil or olive oil is used and most preferably the oil is olive oil. The monoglycerides used are preferably derivatives of oleic, or palmitic acid.

The synthesis of the food spread involves three main steps, mixing the components of oil and monoglyceride, heating the mixture to produce a solution and cooling the solution to form the food spread.

According to step 1 of the synthesis of the food spread, the monoglyceride and oil are mixed. The oil is present preferably in an amount of from about 90 to about 98 percent and most preferably of from about 94 to about 96 percent. The ratio of oil to monoglyceride is preferably from about 9 to about 1 to from about 49 to about 1 and most preferably from about 15 to about 1 to from about 24 to about 1.

According to step 2 of the synthesis of the food spread, the mixture is heated. At room temperature monoglycerides are generally not soluble in the oil. The monoglycerides are preferably dissolved in the oil at temperatures of from 45° C. to about 75° C. and preferably from about 60° C. to about 75° C. and more preferably from about 68° C. to about 70° C. At these temperature, the monoglycerides dissolve and the olive oil mixture becomes a transparent solution.

In step 3 of the synthesis of the food spread, the solution is preferably cooled to room temperature. On cooling, the solution is transformed to a food spread.

Optionally, additives, such as fat soluble flavorings can be added to produce a food spread with a distinctive taste. This is preferable when the oil, such as avocado oil does not have an attractive taste.

EXAMPLE 2

Monoglyceride (derivative of palmitic acid, 4 g) was mixed with extra virgin olive oil (96 g), heated to 68–70° C. and subsequently cooled to room temperature to produce the product. The food spread was stable at 4° C. −4° C. and −18° C.

EXAMPLE 3

Monoglyceride (derivative of palmitic acid, 5 g) was mixed with extra virgin olive oil (95 g), heated to 68–70° C. and subsequently cooled to room temperature to produce the product. The food spread was stable at 4° C. −4° C. and −18° C. and didn't decompose on thawing.

EXAMPLE 4

Monoglyceride (derivative of palmitic acid, 6 g) was mixed with extra virgin olive oil (94 g), heated to 68–70° C. and subsequently cooled to room temperature to produce the product. The food spread was stable at 4° C. −4° C. and −18° C.

EXAMPLE 5

Monoglyceride (derivative of palmitic acid, 4 g) was mixed with distilled avocado oil (96 g), heated to 68–70° C. and subsequently cooled to room temperature to produce the product. The food spread was stable at 4° C., −4° C. and −18° C.

EXAMPLE 6

Monoglyceride (derivative of palmitic acid, 5 g) was mixed with distilled avocado oil (95 g), heated to 68–70° C. and subsequently cooled to room temperature to produce the product. The food spread was stable at 4° C., −4° C. and −18° C.

EXAMPLE 7

Monoglyceride (derivative of palmitic acid, 6 g) was mixed with distilled avocado oil (94 g), heated to 68–70° C. and subsequently cooled to room temperature to produce the product. The food spread was stable at 4° C., −4° C. and −18° C.

The spread of the present invention contains a mixture of an edible oil of natural origin and a monoglyceride. Preferably, the oil is an oil with potential therapeutic properties. In this way, the resulting food spread may have health benefits to the ingester. More preferably, the oil used is olive oil or avocado oil.

Olive oil has been documented as having a therapeutic effect in many conditions including heart disease, cancer and osteoporosis. Olive oil's properties are a result of its chemical composition of 75° C. oleic acid, a monounsaturated fatty acid, approximately 14% polyunsaturated fatty acids, mainly linoleic acid and about 11% saturated fatty acids. In addition to its therapeutic properties, the unique taste of olive oil is enjoyed by many. The food spread of the present invention combines the potential therapeutic properties and the taste of olive oil to produce a healthy alternative to available food spreads. Furthermore, the food spread does not need refrigeration.

It will be appreciated that the above examples and descriptions are intended only to serve as examples, and that many other embodiments are possible within the spirit and the scope of the present invention.

What is claimed is:

1. A food spread comprising a non-aqueous mixture of an edible oil and a monoglyceride in an amount of from about 90% to about 98% edible oil and in a ratio of from about 9 to 1 to about 49 to 1 edible oil to monoglyceride, the food spread being formed by a method comprising the steps of:
   (a) mixing at least one edible oil and at least one monoglyceride in a ratio of from about 9 to 1 to about 49 to 1 edible oil to monoglyceride to produce a dissolved mixture;
   (b) heating said dissolved mixture to a temperature of from about 45° C. to about 75° C.; and
   (c) cooling said dissolved mixture to room temperature, to form a food spread for human consumption, said food spread being stable at temperatures of from about room temperature to about −18° C.

2. The food spread of claim 1, further comprising a fat soluble flavor.
3. The food spread of claim 1, wherein said oil is selected from the group consisting of olive oil, avocado oil, canola oil, soybean oil, sunflower oil, peanut oil, safflower oil, cottonseed oil, coconut oil, rice bran oil, mustardseed oil camelina oil, chia oil, flaxseed oil, perilla oil and corn oil.
4. The food spread of claim 1, wherein said oil is olive oil.
5. The food spread of claim 1, wherein said oil is avocado oil.
6. The food spread of claim 1, wherein said oil is fish oil.
7. The food spread of claim 1, wherein said monoglyceride is a derivative of oleic acid.
8. The food spread of claim 1, wherein said monoglyceride is a derivative of palmitic acid.
9. The food spread of claim 1, wherein said oil is present in an amount of from about 90 to about 98 percent.
10. The food spread of claim 1, wherein said oil is preferably present in an amount of from about 94 to about 96 percent.
11. A method of producing a food spread comprising the steps of:
   (a) mixing at least one edible oil and at least one monoglyceride in a ratio of from about 9 to 1 to about 49 to 1 edible oil to monoglyceride to produce a dissolved mixture;
   (b) heating said dissolved mixture to a temperature of from about 45° C. to about 75° C.; and
   (c) cooling said dissolved mixture to room temperature, to form a food spread for human consumption, said food spread being stable at temperatures of from about room temperature to about −18° C.
12. The method of claim 11, wherein said oil is selected from the group consisting of olive oil, avocado oil, canola oil, soybean oil, sunflower oil, peanut oil, safflower oil, cottonseed oil, coconut oil, rice bran oil, mustardseed oil camelina oil, chia oil, flaxseed oil, perilla oil and corn oil.
13. The method of claim 11, wherein said oil is olive oil.
14. The method of claim 11, wherein said oil is fish oil.
15. The method of claim 11, wherein said monoglyceride is a derivative of oleic acid.
16. The method of claim 11, wherein said monoglyceride is a derivative of palmitic acid.
17. The method of claim 11, wherein said oil is present in an amount of from about 90 to about 98 percent.
18. The method of claim 11, wherein said oil is present in an amount of from about 94 to about 96 percent.
19. The method of claim 11, wherein the step of heating is performed at a temperature in a range of from about 60 to about 75° C.
20. The method of claim 11, wherein the step of heating is performed at a temperature in a range of from about 68 to about 70° C.
21. The method of claim 11, further comprising the step of adding a fat soluble flavor.
22. A food spread comprising a non-aqueous mixture of an edible oil and a monoglyceride in an amount of from about 90% to about 98% edible oil and in a ratio of from about 9 to 1 to 49 to 1 edible oil to monoglyceride, the food spread being formed by a method comprising the steps of:
   (a) mixing at least one edible oil and at least one monoglyceride in a ratio of from about 9 to 1 to about 49 to 1 edible oil to monoglyceride to produce a dissolved mixture;
   (b) heating said dissolved mixture to a temperature of from about 45° C. to about 75° C.; and (c) cooling said dissolved mixture to room temperature, to solidify to a food spread for human consumption, said food spread being stable at temperatures of from about room temperature to about −18° C.

23. A healthy food spread comprising a non-aqueous mixture of an edible oil and a monoglyceride in an amount of from about 90% to about 98% edible oil and in a ratio of from about 9 to 1 to 49 to 1 edible oil to monoglyceride, the food spread being formed by a method comprising the steps of:
   (a) mixing at least one edible oil and at least one monoglyceride in a ratio of from about 9 to 1 to about 49 to 1 edible oil to monoglyceride to produce a dissolved mixture;
   (b) heating said dissolved mixture to a temperature of from about 45° C. to about 75° C.; and
   (c) cooling said dissolved mixture to room temperature, to form a food spread for human consumption, said food spread being stable at temperatures of from about room temperature to about −18° C.

24. A food spread comprising a non-aqueous mixture of an edible oil and a monoglyceride in an amount of from about 90% to about 98% edible oil and from about 2% to about 10% monoglyceride, the food spread being formed by a method comprising the steps of:
   (a) mixing at least one edible oil and at least one monoglyceride in a ratio of from about 9 to 1 to about 49 to 1 edible oil to monoglyceride to produce a dissolved mixture;
   (b) heating said dissolved mixture to a temperature of from about 45° C. to about 75° C.; and
   (c) cooling said dissolved mixture to room temperature, to for a food spread for human consumption, said food spread being stable at temperatures of from about room temperature to about −18° C.

* * * * *